Sept. 16, 1969　　　M. HALSTEAD　　　3,467,106
BODY CONTROL OR FOUNDATION GARMENTS
Filed Oct. 11, 1965　　　　　　　　　　3 Sheets-Sheet 1

INVENTOR.
MARIAN HALSTEAD
BY
Rachenbach & Siegel
ATTORNEYS

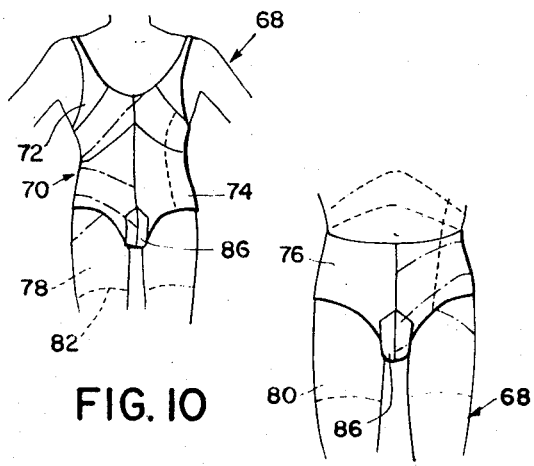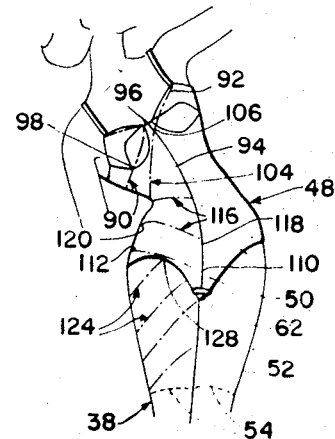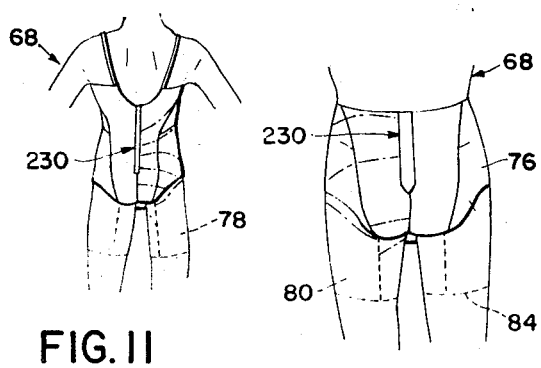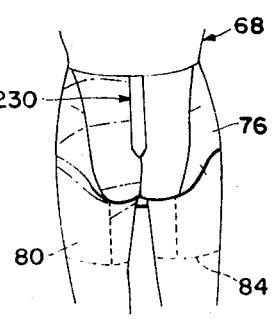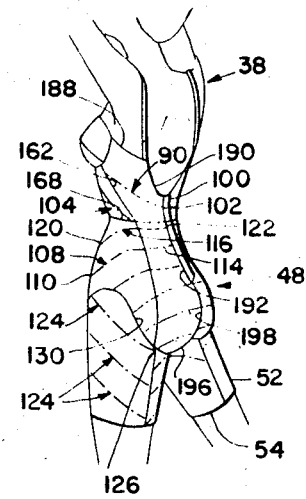

Sept. 16, 1969   M. HALSTEAD   3,467,106
BODY CONTROL OR FOUNDATION GARMENTS
Filed Oct. 11, 1965   3 Sheets-Sheet 3
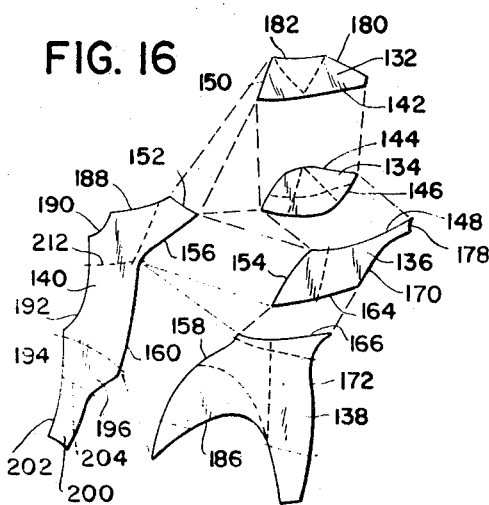
FIG. 16
FIG. 17
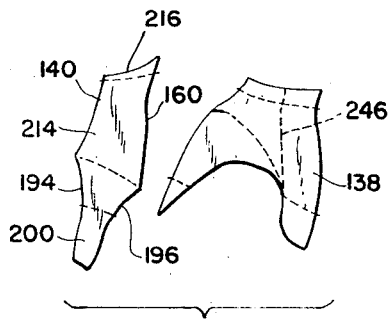
FIG. 18
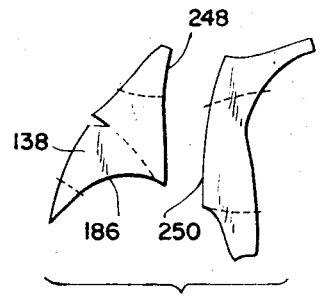
FIG. 19
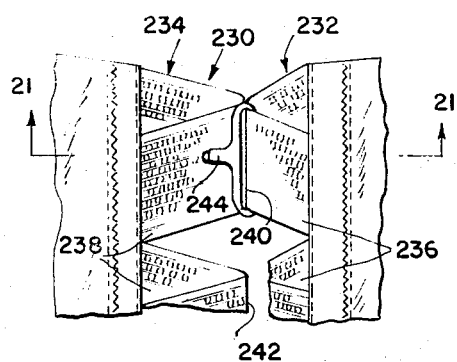
FIG. 20
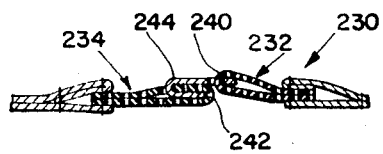
FIG. 21
INVENTOR.
MARIAN HALSTEAD
BY
Rackenbach & Siegel
ATTORNEYS

United States Patent Office

3,467,106
Patented Sept. 16, 1969

---

3,467,106
BODY CONTROL OR FOUNDATION GARMENTS
Marian Halstead, 26 Gramercy Park S.,
New York, N.Y. 10003
Filed Oct. 11, 1965, Ser. No. 494,429
Int. Cl. A41c 1/06
U.S. Cl. 128—431            11 Claims

ABSTRACT OF THE DISCLOSURE

Body control or foundation garment fabricated of a plurality of panels of material contoured, oriented and interconnected to enable the grains thereof to define converging control tensions disposed along control lines extending between a mesial line at the center of front to a mesial line at the center of back when positioned on a wearer's body.

STATEMENT OF THE INVENTION

The present invention pertains, generally, to body control or foundation garments, and, more particularly, to foundation garments for molding the human torso, and for providing positive figure retention and freedom of articulations.

STATEMENT OF THE PROBLEM

The human figure, or torso, generally requires a positive and specific control that yet does not hinder the performance of such normal bodily functions as breathing, or articulation of movement. This is particularly true with respect to those portions of the human figure or torso known as the mammary glands (the breasts), the diaphragm, the abdomen, the buttocks, and the spinal column.

Generally, all portions of the body of a vertebrate presents a certain degree of inherent control. This is true with respect to those portions of the human torso or figure cited above. However, it is not healthy if these portions of the figure or torso are caused to be displaced because of such a change in the degree of control. Moreover, such a change or alternation results in discomfort, and a deterioration of the aesthetics of the human figure or torso, particularly when there is an excessive displacement or protrusion of the mammary glands, diaphragm, and abdomen. This is evidenced, for example, by the presence of large amounts of flaccid tissue. Additionally, an increased stress is imposed upon the remainder of the body or torso. Accordingly, positive assistance in figure control is required, particularly with a view towards supplementing the inherent degree of control, especially in those areas in which a change therein has occurred. This will enable the figure or torso to, in effect, maintain a normal condition of balance, and will further enable it to effect the proper posture and aesthetic appearance.

OBJECTS OF THE INVENTION

Having in mind each and every one of the foregoing problems, and others that will be readily apparent to those skilled in the art, it will be understood that a primary object of the present invention is to provide foundation garments for molding the human torso, and for providing positive figure control, said garment or garments being fabricated of the lightest weight and sheerest cloths or materials.

Another primary object of the present invention, in addition to the foregoing objects, is to provide a foundation garment for molding the human figure or torso, and for providing positive figure control, said garment or garments being constructed of a minimal number or quantity of panels or pieces that are each fabricated of the sheerest materials or fabrics of light weight.

Yet another primary object of the present invention, in addition to each of the foregoing objects, is to provide a foundation garment for molding the human figure or torso, and for providing positive figure control, said garment or garments being constructed of a minimal number or quantity of panels or pieces that are each fabricated of the sheerest materials or fabrics of light weight substantially, if not completely, in the absence of reinforcement.

A further primary object of this invention, in addition to each of the foregoing objects, is to provide a foundation garment comprised of a minimal number or quantity of panels or pieces that are each constructed, configured and arranged to present control lines that correspond generally with the control lines inherently presented by the figure or torso, enabling the control lines of the garment or garments to supplement and assist the control lines of the figure or torso, and to aid in imposing thereupon the proper conditions of balance, further enabling the torso to assume the proper attitude or posture in the absence of any interference with breathing or articulation of movements, while yet still further enabling the garment or garments to be worn in complete comfort.

Additionally, it is a primary object of the present invention, in addition to each of the foregoing objects, to provide a foundation garment for molding the human figure or torso, and for providing positive figure control, said garment or garments being constructed of a minimal number or quantity of panels or pieces that are each fabricated of the sheerest materials of light weight, the seams and edges of which necessitate only a fraction of the finishing required for the seams and edges of the foundation garments presently commercially available, substantially, if not completely, in the absence of reinforcement.

A still further object of the present invention, in addition to each of the foregoing objects, is to provide a foundation garment for molding the human torso or figure, and for providing positive figure control, said garment or garments being constructed of a minimal number or quantity of panels or pieces of the sheerest materials of light weight, and comprising fastening structure that is so constructed as to readily become articulated, arbitrarily adjustable, pliable, contour conforming, irrespective of whether ohe contour to be conformed is curvilinear, sinuous or linear, and strong, while yet presenting an unusual degree of ability to adjust or accommodate variations in the tension subsisting along a given surface.

The invention resides in the combination, construction, arrangement and disposition of the various component parts incorporated in a foundation garment constructed in accordance with the principles of the present invention. It will be better understood, and objects and important features other than those specifically enumerated herein, will become apparent when consideration is given to the following detailed description, which, when taken in conjunction with the annexed drawing, describes, discloses, shows and illustrates preferred embodiments of the present invention, and what is presently considered to be the best mode of practicing the principles thereof. Other embodiments or modifications may be suggested to those having the benefits of the teaching herein, and such other embodiments or modifications are intended to be reserved especially as they fall within the scope and spirit of the subjoined claims.

DESCRIPTION

In the drawings:

FIG. 10 is a front elevational view of a body control or foundation garment constructed in accordance with the principles of the present invention, illustrated as being disposed in a position of use upon the male torso, and showing the location of certain control lines;

FIG. 11 is a rear elevational view of the garment illustrated in FIG. 10, showing the control lines as they extend in a direction rearwardly of the torso;

FIG. 12 is a front elevational view of another type of body control or foundation garment constructed in accordance with the principles of the present invention, illustrated as being disposed in a position of use upon the male torso, and showing the location of certain control lines;

FIG. 13 is a rear elevational view of the garment shown in FIG. 12, and illustrating the location of certain control lines as they extend in a direction rearwardly of the torso;

FIG. 14 is a front elevational view of a complete torso-encompassing body control or foundation garment constructed in accordance with the principles of the present invention, comprising leg-encircling portions, illustrated as being disposed in a position of use upon a female torso, and showing the location of certain control lines;

FIG. 15 is an isometric view of the garment shown in FIG. 14, illustrating the location of the control lines as they extend in a direction about the side and towards the rear of the torso;

FIG. 16 is an exploded view showing the panels or pieces of which a body control or foundation garment constructed in accordance with the principles of the present invention, such as the garment illustrated in FIG. 7, for example, is comprised;

FIG. 17 is an exploded view showing the panels or pieces of which a brassiere constructed in accordance with the principles of the present invention, such as the brassiere shown in FIGS. 1 and 2, for example, is comprised;

FIG. 18 is an exploded view illustrating the panels or pieces of which a panty-girdle, such as the panty-girdle shown in FIGS. 1 and 2, for example, is comprised;

FIG. 19 is an exploded view illustrating the panels or pieces of which another embodiment of a body control or foundation garment constructed in accordance herewith is comprised;

FIG. 20 is a partial detailed view, drawn to an enlarged scale, of fastener structure adapted to be utilized with the body control or foundation garments of the present invention; and FIG. 21 is a cross-sectional view taken along the line 21—21 of FIG. 20.

Figures 1, 2:
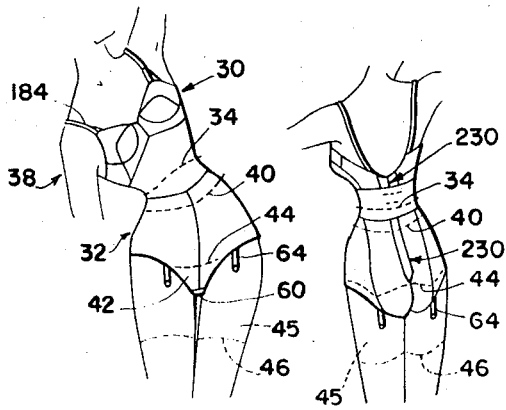
FIG. 1 is a front elevational view of a brassiere and panty-girdle constructed in accordance with the principles of the present invention, illustrated as being disposed in a position of use upon a female torso.
FIG. 2 is a rear elevational view of the garments shown in FIG. 1.
Figures 5, 6:
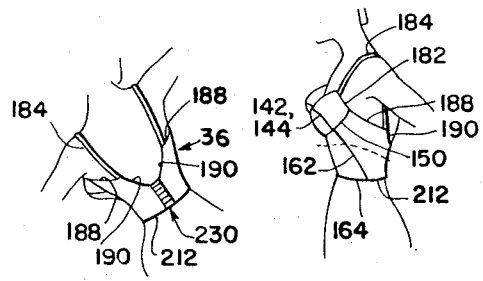
FIG. 5 is a rear elevational view of a long-line brassiere constructed in accordance with the principles of the present invention, illustrated as being disposed in a position of use upon a female torso.
FIG. 6 is a side elevational view of the garment shown in FIG. 5.

With reference now to the drawings, a brassiere 30 and panty-girdle 32 are illustrated in FIGS. 1 and 2. It will be understood that the brassiere 30 may be longer, terminating at the dotted line 34 shown therein, in which case there will be defined a long-line brassiere 36, as shown in FIGS. 5 and 6. Similarly, the panty-girdle 32 may be shorter at the waist of the torso 38, as indicated by the dotted line 40, so that the upper edge thereof will encompass and rest upon the hips of the torso. The crotch piece 42 of the girdle 32 may be eliminated to define a conventional open-bottom girdle, as indicated by the dotted line 44. A panty-girdle illustrated comprising the crotch piece 42, may also comprise leg sections 45 extending along and about the thighs of the torso 38, terminating at the dotted lines 46.

Figure 7:
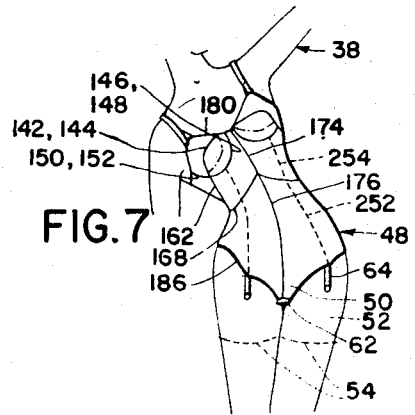
FIG. 7 is a front elevational view of a corselet constructed in accordance with the principles of the present invention, illustrated as being disposed in a position of use upon a female torso.

A corselette 48 is illustrated in FIGS. 3, 4, 7, 14 and 15. In FIGS. 7, 14 and 15, the panty-corselette is illustrated as comprising a crotch piece 50, and may also comprise leg sections 52 extending downwardly along and about the thighs of the torso 38 terminating at the lower edge 54 thereof.

Figure 9:
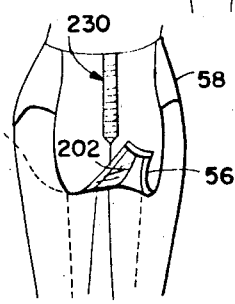
FIG. 9 is a rear elevational view of a body control or foundation garment constructed in accordance with the principles of this invention, illustrating the arrangement of at least one of its panels or pieces enabling certain normal bodily functions to be performed without the removal thereof.

In FIG. 9, the crotch piece 56 of an undergarment 58 is illustrated as being detachably connected thereto to facilitate the performance of normal bodily functions without requiring removal of the garment. This teaching is equally applicable to all of the garments hereinbefore described, and those hereinafter to be described, where a crotch piece is utilized. For example, the crotch piece 42 of the garment 32 might be detachable along the length thereof at the pubic bone of the torso 38, as indicated by the reference character 60. Similarly, the crotch piece 50 of the garment 48 might be detachable at the same location, as indicated by the reference character 62. It will be understood that the crotch piece has been defined in this manner to facilitate an understanding of this invention. Actually, the crotch piece will be unitary, and will extend from the rear of the garment to the front thereof, terminating at the location indicated by the reference characters 60 and 62. What has hereinbefore been described as a portion of the crotch piece extending upwardly from the area of the pubic bone to the front panels of the garment will actually be integral with the latter. The manner in which the crotch pieces 42 and 50 are detachably connected to the garment may be accomplished in any suitable manner, as for example, by suitable snap fasteners, hooks and eyes, and the like (not shown).

It will also be understood that body control or foundation garments constructed in accordance herewith may comprise hosiery supporters or garters 64 for detachably connecting a pair of hose (FIGS. 3 and 4) with respect thereto.

The principles of the present invention are equally applicable to undergarment adapted to be worn upon the male torso 68, as shown in FIGS. 10–13. In FIGS. 10 and 11, a complete male control garment 70 comprising a chest portion 72 and a girdle portion 74 is illustrated. In FIGS. 12 and 13, the male undergarment comprises only a girdle portion 76. The girdle portions 74 and 76 may, in each instance, comprise leg sections 78 and 80, respectively, extending downwardly along and about the thighs of the torso 68, and terminating at lower edges 82 and 84 thereof. The girdle portion 74 and 76 of each garment has a crotch piece 86 which may, as can be the crotch pieces of the female garments, be detachable to facilitate the performance of normal bodily functions.

It is to be expressly understood that while the present invention is illustrated and shown in exemplary embodiments or modifications applied to foundation garments such as girdles, brassieres, corsets, corselettes, and the like, the invention is not to be deemed limited thereby. Rather, the present invention is likewise applicable as applied to substantially any garment including, without limitation, inner garments and outer garments such as, without limitation, swimsuits, trousers, slacks, shirts, dresses, gowns, and the like. Accordingly, the terminology "body control garment" is to be construed and interpreted in its broadest possible sense. Moreover, such terminology is not to be construed or interpreted in a limiting sense either in the description or the subjoined claims, since the same is used merely to facilitate an understanding of and clearly set forth and particularly define the present invention.

The female torso 38 is shown as having assumed different attitudes or positions in the drawings. This has been done to illustrate that the action of the undergarments positioned thereupon, such as the brassiere 30 and the panty-girdle 32 of FIGS. 1 and 2, is one of "no-drag;" that is, only that portion of the undergarment placed against those portions of the torso or body that change their attitude or position will be raised or lowered. The remaining portions of the foundation garments will not change their position or be displaced. The foundation garments, therefore, maintain their control of the torso or body irrespective of the attitude or position thereof, as will more fully be described hereinafter. This principle will be understood to apply to the male foundation garments 70 and 76, as well.

The foundation garments of the present invention may be fabricated of any suitable and desired material and, in fact, may be fabricated of the sheerest and lightest materials available. Additionally, the fabric chosen may be stretchable or distensible in one or a plurality of directions, or may be non-distensible or substantially rigid. A body control on foundation garment constructed in accordance herewith may, therefore, be stretchable, rigid or a combination thereof. Every material, whether it be stretchable, rigid or a combination thereof, has a grain extending in or along one direction that exerts "more positive tension" or "more positive control" than any other grain of the material or fabric. Stated in other words, the grain of the fabric that will destend or elongate less than any other grain thereof will exert positive tension or control. It is requisite that the body control on foundation garments of this invention be constructed to dispose the grain that exercises this "more positive tension or control" in or along certain directions, hereinafter to be more fully described, with respect to the body or torso, it being remembered that this requirement holds true irrespective of whether the fabric from which the garment is constructed is stretchable, rigid, or a combination thereof.

To this end, the body control or foundation garments of this invention are constructed of a plurality of panels, hereinafter to be more fully described. The panels are cut in such a manner that the periphery thereof will be disposed at an angle with respect to the grain that exercises more positive tension or control which, in turn, will cause the latter to extend in or along a certain direction or directions with respect to the body or torso. In connecting the panels together, the grain that exercises more positive control or tension of some of the panels will be aligned with that grain of some of the other panels to define "control lines" extending in or along the aforesaid certain direction or directions.

After a great deal of experimentation, it has been found that foundation garments constructed in accordance herewith will provide maximum retention or replacement and uplift especially with respect to the critical areas of the body or torso, namely, the mammary glands, the diaphragm, abdomen, buttocks, and the spinal column when they are constructed so that the more positive tension of the fabric defines and maintains a series of control lines extending from a mesial line at the center of front to a mesial line at the center of back. The mesial line at the center front is defined by a line extending between the fifth cartilage of the sternum and the center of the crest of the pubic bone. The mesial line at the center back is defined by a line extending between the eleventh thoracic vertebra and the first sacrum. These functions will be performed even though the garment is constructed of the sheerest cloth, of the fewest possible panels, even in the absence of reinforcement, and irrespective of whether the fabric is stretchable, rigid, or a combination thereof. Moreover, the garment will perform these functions without hindrance to breathing or articulation of movement. And, as hereinbefore pointed out, both portions of the garment that move with the body or torso as the latter articulates will not disturb or cause the remainder of the garment to change its position relative thereto. The garments of this invention are, therefore, "no-drag" garments. Riding, bunching, binding, and the like is thus eliminated.

With respect now to FIGS. 14 and 15, it will be understood that positive uplift and articulated control of the mammary glands will be achieved by control lines, such as the control line generally designated by the reference character 90 which begins at the location 92. This location corresponds generally with the third rib of the torso 38 at the top of the right mammary gland. The control line 90 crosses the mesial line 94 at the center front at the fifth rib of the sternum, indicated by the reference character 96 and continues along the sixth rib at the inferior edge of the left mammary gland, indicated by the reference character 98. This control line then continues around the chest cage terminating along the mesial line 100 of the center back at approximately the eleventh thoracic vertebra, indicated by the reference character 102.

The diaphragm of the body or torso 38 is controlled, in combination with the above control lines, such as the control line 90, by additional control lines, such as the control line generally designated by the reference character 104. This control line begins along the center front mesial line 94 at the sternum 106 (a location corresponding generally with the sixth rib) and continues laterally and downwardly to the inferior edge of the tenth rib at the side chest cage. If the panel, to be described more fully hereinafter, having this control line continued to the center back of the body or torso 38, the control line 104 would converge to and terminate along the center back mesial line 100 at approximately the first lumbar vertebra.

Positive uplift and articulated control of the lower abdomen is provided by control lines, such as the control line generally designated by the reference character 108. This control line begins along the center front line 94 at the center of the public bone, designated by the reference character 110, and continues in a direction laterally upwardly over the side of the hip just above the crest of the greater trochanter, designated by the reference character 112. The control line 108 then continues towards the rear of the torso 38, and converges on the center of the first sacrum, designated by the reference character 114, along the center back mesial line 100. Positive uplift and articulated control of the abdominal area in general is provided by control lines generally designated by the reference character 116, which are disposed in a substantially parallel relationship with the control line 108. The control lines 116 extend from the center front mesial line at the lower edge of the upper third of the abdomen, as indicated by the reference character 118, and continue over the crest of the ilium, as designated by the reference character 120. These control lines then converge upon and terminate along the center back mesial line 100 at the first lumbar vertebra, designated by the reference character 122.

Positive uplift and articulated control of the thighs of the body or torso 38 will be achieved by the control lines generally designated by the reference character 124.

These control lines begin under the gluteofemoral crease, a location indicated by the reference character 126, extend upwardly along and about the thighs, and converge along the access of the anterior superior spine of the ilium, a location designated by the reference character 128. It will be understood that generally only one of the control lines 124 will actually begin at the location 126 of the gluteo-femoral crease, and only one of these same control lines will actually terminate along the access of the anterior superior spine of the ilium, or location 128. The remaining control lines 124 for providing positive uplift and articulated control of the thghs will be substantially parallel thereto. Of course, those foundation garments which do not comprise leg sections, such as the leg sections 52, will not be constructed to define control lines that provide positve uplift and articulated control of the thighs of the torso or body 38.

The buttocks will be lifted and firmed by the positive tension of the fabric from which the garment is constructed along a line 130 which follows the gluteofemoral crease. In fabricating the panels, hereinafter to be more fully described, which encompass the buttocks, the tensional control along that portion of the line 130 which follows these creases is more positively confined than along the remainder of this line, which extends along the superior rim of the thighs. Additional positive uplift of the buttocks is provided by the control line 124 which begins at the location 126 under the gluteofemoral crease. Additionally, the buttocks are firmed by those control lines which parallel the control line 108 and extend substantially across that portion of the body or torso 38.

The spinal column is basically the controlling structure of vertebrates. Accordingly, it will be reinforced and supported by those control lines hereinbefore described, such as control lines 90 and 108, which converge upon the center back mesial line 100. This is true since these lines, because they are defined by that grain of the fabric which exerts the greatest positive tension or control, is responsible for, in effect, applying a force at the spinal area of the body or torso 38, thus causing its reinforcement and support.

It will now be understood that the male garments 70 and 76 illustrated in FIGS. 10–13 are constructed so that substantially the same control lines are presented. Accordingly, the garments 70 and 76 will be capable of providing positive uplift and articulated control of the critical areas of the male torso 68 as well.

With particular refrence now to FIG. 16 of the drawings, one-half of the panels comprising the pantry-corselette 48 shown in FIG. 7 are illustrated therein. The remaining panels comprising this garment are identical with those shown in FIG. 17. The dotted lines extending between the panels shown in this figure are utilized to illustrate along which lines the panels are connected together to form the completed garments. It has been pointed out hereinbefore that the objects of the present invention can be achieved by utilizing a minimum number of panels. Such a minimum number of panels for the panty-corselette of FIG. 7 is illustrated in this FIG. 16, it being remembered that only one-half are shown therein. However, it may be desired to fabricate the corselette 48 of a greater number of panels. The dotted lines contained wholly within the peripheries of the panels shown in that figure illustrate the lines along which the panels may be cut or severed to present additional panels. It is also to be remembered, at this point that the peripheries of the panels along which they are cut or severed are chosen to insure that the control lines hereinbefore described will extend in their required directions.

It is considered readily apparent that the human body or torso is comprised of no truly straight or linear lines. Rather, the human anatomy comprises numerous curves or undulations. It may be said, therefore, that the human anatomy, body or torso is defined by a large number of curvilinear lines. Accordingly, and in addition to each of the foregoing criteria for fabricating the panels, it has been found necessary to construct all of the panels of generally arcuate configuration having substantially no straight or linear lines. In other words, the periphery of each of the panels shown in FIG. 16 comprising the corselette of FIG. 7 comprises a plurality of curvilinear lines.

The panty corselette 38 comprises two of the panels 132, 134, 136, 138 and 140. The panels 132 and 134 will be connected together along the curvilinear lines 142 and 144 to define each cup of the brassiere or braselette portion thereof. It will be seen that, in accordance with the foregoing, the lines 142 and 144 are curvilinear, so that when sewn together, they conform with the configuration of the mammary glands. Similarly, the panels 134 and 136 are connected together along the lines 146 and 148. These lines are also of curvilinear configuration so that, when sewn together, they conform with a substantial portion of the periphery of the mammary glands along the inferior edge thereof. The remainder of the inferior peripheral edge of the mammary glands is defined by connecting together the panels 132 and 140 along the lines 150 and 152, which are of the required curvilinear configuration. The panel 136 is connected to the panel 140 along the lines 154 and 156, and the panel 138 is connected to the panel 140 along the lines 158 and 160. These lines are also of curvilinear configuration so that when the panels 136, 138 and 140 are connected together therealong, a line 162 of curvilinear configuration is defined. This curvilinear line 162 is, in effect, a continuation of the line 142, 144, and extends from the inferior edge of the mammary gland to the gluteal-femoral crease at the rear of the body or torso 38. The configuration of this line 162, as is now considered readily apparent, conforms with the configuration of the body or torso between these locations. The panels 136 and 138 will be connected together along the curvilinear lines 164 and 166 so that, when connected together, a line 168 of curvilinear configuration extends from the mesial center front to the line 162. The configuration of this curvilinear line 168 will correspond generally with the configuration of the body or torso between those locations.

The panel 136 is connected with a companion panel of identical configuration along the curvilinear line 170. The same is true with respect tothe panel 138 along the curvilinear line 172. Accordingly, there will be defined curvilinear lines 174 and 176 extending along the mesial center front of the body or torso 38. These lines will be disposed in alignment with one another, and when taken together, will conform substantially with the configuration of the body or torso between the sternum (substantially at the fifth rib—corresponding generally with the location designated by the reference character 96 in FIG. 14) and the center of the pubic bone (corresponding generally with the location designated by the reference character 110 in that figure). The panel 136 and its companion panel of identical configuration each define a portion 178. When the panel 136 is connected to its companion panel, the portions 178 define a stand 180 of the brassiere portion of the garment.

The remaining peripheral edges of the panels 132, 138 and 140 are similarly of curvilinear configuration. For example, the edges 180 and 182 of the panel 132 which extend towards the shoulder straps 184 of the brassiere portion of the foundation garment are of curvilinear configuration to conform with the contour of the body or torso at that location. The peripheral edge 180 may be of substantially linear configuration. The peripheral edge 186 is also of curvilinear configuration, and generaly conforms with the contour of the body or torso along the line beginning substantially at the center of the pubic bone (a location corresponding generally with the reference character 110) continuing laterally upwardly and over the side of the hip, and terminating at the gluteofemoral crease (a location corresponding generally with the reference character 126).

The panel 140 also comprises the peripheral edges 188, 190, 192, 194 and 196. The peripheral edges 188 and 190 are of curvilinear configuration, and in accordance with the foregoing, conform generally with the contour of the body or torso 38 at these locations. When the panel 140 is connected with its companion panel of identical configuration, the peripheral edge 192 of each defines the center back mesial line 100. The curvilinear configuration of this line will conform generally with the configuration of the body or torso generally between the eleventh thoracic vertebrae and the first sacrum at the location. When the panel 140 and its companion panel are connected together along the peripheral edges 194, a line 198 will be defined extending from the end of the center back mesial line 100 substantially at the first sacrum to the gluteal-femoral crease. The configuration of the edges 194 are similarly chosen so that the resulting line 198 will conform with the configuration of the body or torso at that location.

Figures 3, 4:
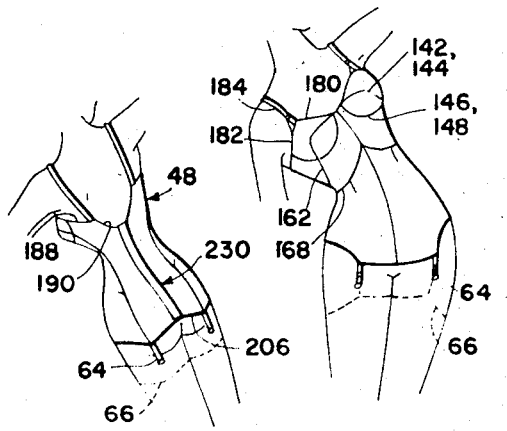
FIG. 3 is a rear elevational view of a braselette constructed in accordance with the principles of the present invention, illustrated as being disposed in a position of use upon a female torso.
FIG. 4 is a front elevational view of the foundation garment shown in FIG. 3.

The panel 140 shown in FIG. 16 comprises a one-half crotch piece 200. This one-half crotch pieces, when connected together with its companion piece of identical configuration along the peripheral edge 202 of curvilinear configuration, defines any one of the crotch pieces hereinbefore described and discussed. As also indicated hereinbefore, the crotch piece may be eliminated. Accordingly, there will be defined a peripheral edge 204 of curvilinear configuration which, when taken in conjunction with the peripheral curvilinear edge 196, will define the curvilinear line 206 that extends across the buttocks, as shown in FIGS. 3 and 4. This line 206 will, of course, be of curvilinear configuration to conform with the body or torso 38 at that location.

In view of the foregoing, it will be understood that the natural and inherent peripheries and contours of the body or torso 38 will nestle firmly into and against the assembled foundation garments. While the foregoing description has been applied to the corselette illustrated in FIGS. 7, 14 and 15, it will be understood that the panels of the other female foundation garments are constructed in accordance with exactly the same principles. Accordingly, like reference characters have been used throughout the drawings in which the various female foundation garments are illustrated both to facilitate an understanding of the present invention, and to avoid duplicate description as well as unnecessary confusion. Moreover, it will be understood that the same principles apply to the undergarments illustrated in FIGS. 10–13 adapted to be worn upon the male torso. Irrespective of whether the panels comprise a female or male undergarment, the panels comprising the leg sections thereof will also be constructed in accordance with the same principles.

These arcuate or curvilinear shapes, peripheries, edges or lines will persist, proportionately, in foundation garments encompassing only sectional parts of the anatomy, whether it be male or female. For example, the panels comprising the braselette shown in FIGS. 5 and 6 are illustrated therein. It will be noted that the panels 132, 134 and 136 are utilized in exactly the same shape and form illustrated in FIG. 16. A panel 208 is substantially identical with that portion of the panel 140 encompassed within the curvilinear peripheral edges 152, 156, 188, 190, 192 and a curvilinear peripheral edge 210 defined by severing the panel 140 along the dotted line 212. Of course, the completed braselette will comprise panels identical with each of those shown in FIG. 17.

In FIG. 18, one-half of the panels comprising the panty-girdle 32 illustrated in FIGS. 1 and 2 are shown therein. The panty-girdle comprises the panel 138 and a companion panel of identical configuration, both of which are the same as the corresponding panel shown in FIG. 16. In addition, the panty-girdle comprises a panel 214 and a companion panel of identical configuration. The panel 214 is substantially the same as the panel 140 shown in FIG. 16, and comprises the curvilinear peripheral edges 140, 160, 194 and 196. The panel 214 comprises, in addition, the curvilinear peripheral edge 216 which, like the panel 208 of FIG. 17, is defined by cutting the panel 140 along the dotted line 212.

Figure 8:
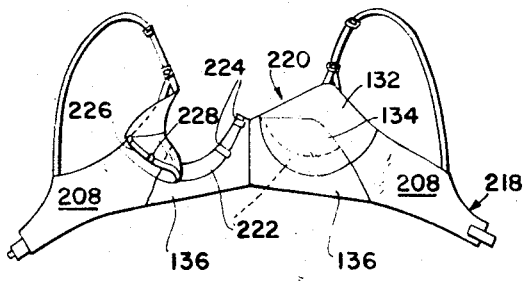
FIG. 8 is a front elevational view of a nursing brassiere constructed in accordance with the principles of the present invention.

With particular reference now to FIG. 8, and with continued reference to FIG. 17, the panels 132, 134, 136 and 208 are illustrated as comprising a nursing brassiere 218. The panels 132 and 134 together comprise the breast portions or cups 220 thereof. In order to enable the wearer to perform a nursing function, the cups 220 are detachable with respect to the panels 136. To this end, the latter comprise a band 222 along which either the male or female element of suitable fastener structure 224 is positioned. In a similar manner, the panel 134 comprises a band 226 along which the other element 228 of the fastener structure is positioned. It will now be remembered that the control line 90 crosses the center front mesial line 94 at the sternum and continues along the inferior edge of the mammary glands to provide sufficient positive uplift and articulated control thereof. The panels 136 and 208, at least in part, will present control lines of this nature. Accordingly, the cups 220 can be completely drawn away from the panels 136 to enable the wearer to perform the nursing function.

It may be desirable to facilitate adjustment of the control afforded by the various foundation garments constructed in accordance herewith, and fitting of the various body shapes defined thereby. To this end, any of the foundation garments hereinbefore disclosed may comprise adjustable and articulated fastening structure that may be applied partially or completely along the grooved areas of the body. For example, suitable fastening structure may be positioned completely along the center front mesial line 94 of the corselette 48. Similarly, suitable fastener structure may be positioned along that portion of the mesial line 94 presented by the brassiere 30 of FIGS. 1 and 2, the panty-girdle 32 shown therein, or the braselette 36 illustrated in FIGS. 5 and 6. Similarly, suitable fastener structure may be positioned completely along the center back mesial line 100 of the corselette 48, or along only that portion of this mesial line defined by the brassiere 30, the panty-girdle 32, the braselette 36, and the undergarment 58 shown in FIG. 9. Similarly, the male undergarments shown in FIGS. 10–13 may comprise suitable fastener structure partially or completely along the same grooved areas of the body or torso 68. In each case, this fastener structure is designated by the reference character 230.

This fastener structure may be of any suitable construction. With reference now to FIGS. 19 and 20, an exemplary form of the fastener structure 230 is illustrated therein. It comprises a male portion 232 and a female portion 234. The male and female portions comprise segments 236 and 238, respectively, which may be of any suitable or desired configuration. The segments 236 and 238 may be fabricated of any suitable material, for example, meshed, knitted, or irregularly spaced perforated material. Additionally, the segments are connected along one edge to the panels of the garment adapted to be adjustable with respect to one another. In the exemplary form illustrated, the segments 236 and 238 are of generally rectangular configuration, and are turned upon themselves to define free edges 240 and 242, respectively. Since the segments are turned upon themselves, they define loops, as is considered readily apparent. A hook 244 of any suitable and conventional construction cooperates with the loops of the male segments 236. The hook 244 is, as is now considered readily apparent, adapted to be removably positioned within the many perforations of the female segments 238. Due to the many perforations available, an equal number of adjustable positions of the male segments 236 along the female segments 238 can be selected. In turn, the foundation garment will be capable of an equally great degree of adjustment with respect to the body or torso.

With particular reference now to FIG. 19, the panel 138 is illustrated therein as being severed along the dotted line 246 (see FIG. 18). The panel 138 will therefore comprise, in addition, peripheral edges 248 and 250 of curvilinear configuration. The male and female segments 236 and 238 may be connected along the peripheral edges 248 and 250, so that the fastener structure 230 will extend substantially along the line 252 of the corselette 48 shown, for example, in FIG. 7. It may be desirable to provide a foundation garment that can be worn by the female during the period of gestation. Such a garment desirably should comprise fastener structure along the lines 252 to provide for maximum adjustment of control and fit at those areas of the body or torso. It may even be desirable to extend the fastener structure 230 upwardly along the lines 254 shown in FIG. 7, and to construct the braselette portion of the corselette 48 accordingly. It is to be understood, at this point, that the brassiere portion of the corselette may be constructed in accordance with the principles illustrated in FIG. 8 and hereinbefore described. Any of the other foundation garments may have fastener structure extending along similar portions of the body or torso.

In view of the foregoing, it will now be understood that the object set forth at the outset of this specification can be achieved by body control or foundation garments constructed in accordance herewith. Such garments provide for maximum uplift and firming of the mammary glands, the diaphragm and abdomen. In addition, these garments retain the greatest amount of articulation, while yet enabling complete freedom in breathing and necessary expansion. The garments will displace the least relative to the body or torso, and will exert even control and tension completely throughout, or with respect to only sectional areas thereof. Cutting, binding, riding, bunching, and the like will be eliminated, as will bulging of the flesh. The final result, and a most desirable one, is that the wearer will be emotionally poised, confident, and will present an aura of well-being.

While the invention has been shown, illustrated, described and disclosed in terms of embodiments or modifications that it has assumed in practice, the scope of the invention should not be deemed limited by the precise embodiments or modifications herein shown, illustrated, described or disclosed, such other embodiments or modifications intended to be reserved especially as they fall within the scope of the claims here appended.

What is claimed is:

1. Body control or foundation garment comprising a plurality of panels of material having grain defining a direction of minimum distension or elongation and maximum tension, wherein said panels are contoured, oriented and interconnected to enable the grains thereof to maintain control tensioning generally along at least one generally curvilinear control the generally coincident with the torso contours and extending generally between a mesial line at the center of the front and a mesial line at the center of back when the garment is positioned on the torso of a wearer to enable positive control and firming of such torso irrespective of the attitude or position thereof, the retention of control and the replacement of tension after articulation.

2. Body control or foundation garment defined in claim 1 wherein said panels are contoured, oriented and interconnected to define a plurality of generally curvilinear convergent control lines extending generally coincident with the torso contours to maintain generally covering control tensions generally therealong.

3. Body control or foundation garment defined in claim 1 wherein said control line extends from a location corresponding generally with a superior edge of one of the mammary glands of the female torso on one side thereof substantially at the third rib and, after crossing the mesial line of the center of front generally along the fifth rib of the sternum, continues along the sixth rib generally at the inferior edge of the opposite mammary gland, and thence around the chest cage terminating along the mesial line at the center of back approximately at the eleventh thoracic vertebra, enabling positive uplift and articulated control of the mammary glands.

4. Body control or foundation garment defined in claim 1 wherein said control line begins generally along the mesial line at the center of front substantially corresponding with the sixth rib of the sternum and continues laterally and downwardly along the inferior edge of the tenth rib substantially at the side of the chest cage, and to approximately the first lumbar vertebra at the mesial line at the center of back, enabling control of the diaphragm.

5. Body control or foundation garment defined in claim 1 wherein said control line begins along the mesial line at the center of front substantially at the center of the pubic bone, continues generally laterally upwardly over the side of the hip substantially adjacent the crest of the greater trochanter and substantially to the center of the first sacrum along the mesial line at the center of back, enabling positive uplift and articulated control of the lower abdomen.

6. Body control or foundation garment defined in claim 5 wherein there is further defined at least one additional control line disposed in substantial parallel relationship with the first mentioned control line which extends along and corresponds generally with a line on the torso that extends between the mesial line at the center of front generally at the lower edge of the upper third of the abdomen, continues over the crest of the ilium and converges upon and terminates generally at the mesial line at the center of back approximately at the first lumbar vertebra, enabling positive uplift and articulated control of the abdomen in general.

7. Body control or foundation garment defined in claim 5 wherein there is further defined at least one additional control line disposed in substantial parallel relationship below the first-mentioned control line and which extends along the derriere for providing positive uplift and articulated control thereof.

8. Body control or foundation garment defined in claim 1 wherein said control line extends along and is adapted to correspond generally with the gluteofemoral crease for lifting and firming the derriere.

9. Body control or foundation garment defined in claim 1 wherein said control line extends from a location just underlying the gluteofemoral crease outwardly along and about the thighs to the axis of the anterior superior spine of the ilium, enabling positive uplift and articulated control of the thighs.

10. Body control or foundation garment defined in claim 9 wherein there is further defined at least one additional control line disposed in substantial parallel relationship below the first-mentioned control line.

11. Body control or foundation garment defined in claim 1 wherein a substantial majority of the peripheral edges of said plurality of panels are of arcuate or curvilinear configuration, enabling the configuration of the lines resulting from connecting together the panels along their peripheral edges to correspond generally with the contour of each of those portions of the torso to be encompassed thereby.

References Cited
UNITED STATES PATENTS

| | | | |
|---|---|---|---|
| 2,143,815 | 1/1939 | Fridolph | 128—535 |
| 2,481,818 | 9/1949 | Brown | 128—444 |
| 2,822,547 | 2/1958 | Halstead | 128—446 |
| 3,157,182 | 11/1964 | Fridolph | 128—429 |

ADELE M. EAGER, Primary Examiner

U.S. Cl. X.R.

128—446